Nov. 28, 1967 — G. A. WAHLMARK — 3,354,791
PISTON
Filed May 24, 1965
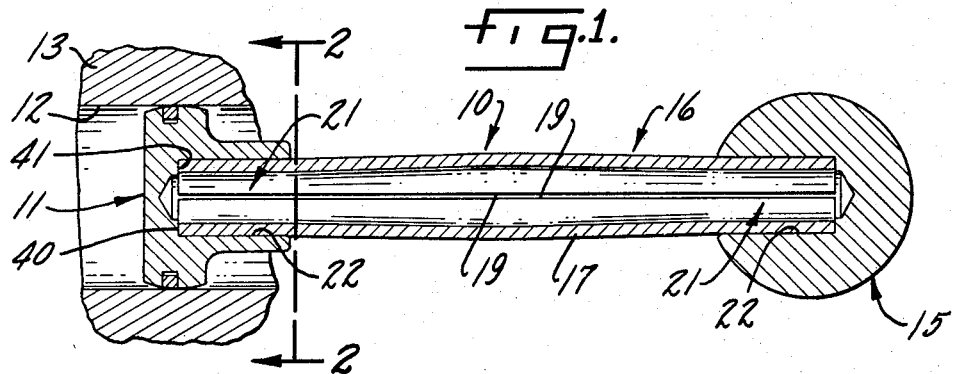
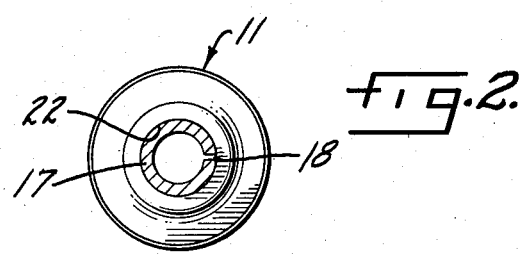
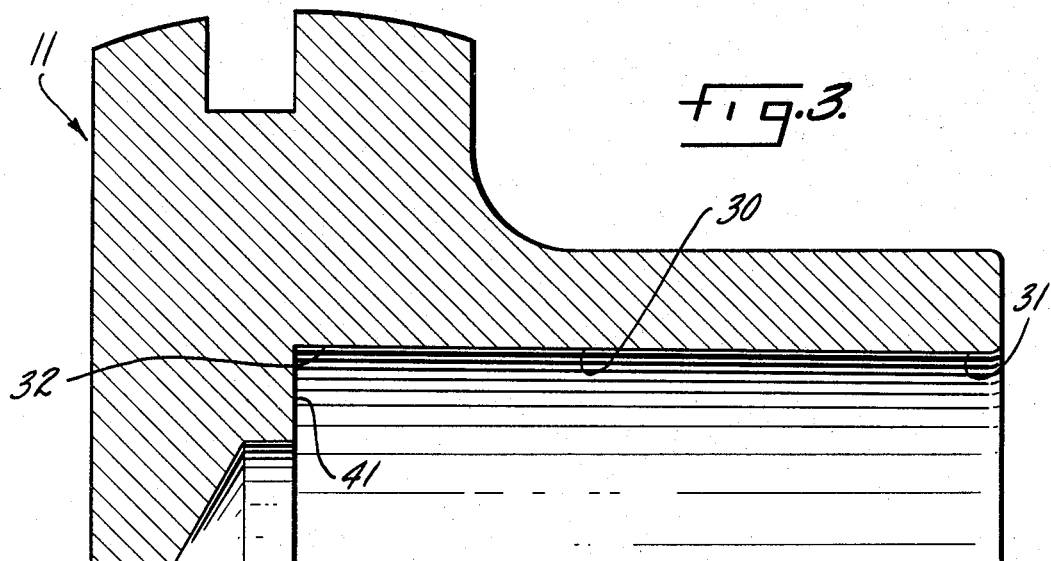
INVENTOR.
Gunnar A. Wahlmark,
BY
Hume, Groen, Clement & Hume
Attorneys.

United States Patent Office 3,354,791
Patented Nov. 28, 1967

3,354,791
PISTON
Gunnar A. Wahlmark, 211 S. Rockford Ave.,
Rockford, Ill. 61108
Filed May 24, 1965, Ser. No. 458,004
4 Claims. (Cl. 92—109)

ABSTRACT OF THE DISCLOSURE

The invention is a piston construction including separate head, shank, and drive connector components wherein the shank comprises a radially resilient roll pin. The roll pin is a seamed, hollow tube which is locked by its own resiliency in generally circular cylindrical bores formed in the head and drive connector components. The bore walls diverge inwardly so that greater radial expansion of the pin at the base of each bore enhances the lock.

---

This invention relates in general to piston type engines, motors, and pumps and the like. It deals more particularly with the construction of pistons for these devices.

It is conventional in the construction of piston type engines, motors, and pumps and the like, to machine pistons from single pieces of alloy steel. In swash plate fluid devices, for example, the piston head, which is adapted for suitable sliding movement in a corresponding cylinder, and a ball joint adapted for universal connection to the swash mechanism, together with a shank inter-connecting them, are conventionally parts of a unitary piston construction. This type of piston construction is eminently satisfactory in operation, as might be expected, being precision machined and having high strength characteristics. Unfortunately, such a piston construction is also relatively expensive to manufacture and, in addition, damage to any one portion of the piston requires the discard of the entire piston.

It is an object of the present invention to provide a new and improved piston construction.

It is another object to provide a simple and inexpensive piston construction which is, nevertheless, a precision device possessed of high strength and durability.

It is still another object to provide a piston constructed of separate head, shank, and drive connector components, facilitating ready replacement of individual damaged components, for example, as well as a wide range of choice in piston length with primarily standard components.

It is yet another object to provide a new and improved piston construction wherein the piston shank is formed of a conventional roll pin.

It is a further object to provide a new and improved piston construction for swash plate type fluid devices.

The foregoing and other objects are realized in accord with the present invention by providing a piston constructed of separate head, shank, and drive connector components, wherein the shank comprises a conventional roll pin. In a swash plate type fluid device, for example, the piston head and ball joint connector are separately machined alloy steel components. A generally cylindrical bore is formed in each of these components for receiving a corresponding end of a roll pin of predetermined diameter and length. Each bore is purposely formed with a slightly smaller diameter than the corresponding end of the roll pin to form an interference lock with the resilient, radially compressible roll pin. The bores are, in addition, purposely formed with diverging walls to define frusto-conical seats for corresponding pin ends which enhance the lock between the pin and the ball joint and piston head components.

The invention, both as to its organization and method of operation, taken with further objects and advantages thereof, will best be understood by reference to the following description taken in connection with the accompanying drawings, in which:

FIGURE 1 is a sectional view taken through a piston for a swash plate type fluid device, constructed in accordance with the present invention;

FIGURE 2 is a view taken along line 2—2 of FIGURE 1; and

FIGURE 3 is a sectional view of a piston head constructed in accord with the present invention, with the lower half-section removed.

Referring now to the drawings, and particularly to FIGURE 1, a piston constructed in accord with the present invention and adapted for use in a swash plate type fluid device (not shown) or the like is illustrated generally at 10. The piston 10 includes a piston head 11 mounted for sliding movement within the cylinder 12 of a cylinder barrel 13 (only partially shown). A ball joint drive connector 15 forms the other end of the piston 10 and is adapted to be connected to a swash mechanism (not shown).

The shank 16 of the piston 10 comprises a single roll pin 17 of conventional construction. The roll pin 17 is fabricated of a sheet of tempered steel rolled into a circular cylinder, leaving a longitudinally extending seam 18 between the adjacent edges 19 of the sheet. This shank 16 construction has been found to provide axial compressive strength comparable with the solid steel shank of a machined, one-piece piston, while reducing the overall cost of the piston 10 embodying features of the present invention to but a fraction of the cost of a machined piston, in addition to securing other hereinafter elicited advantages.

The pin 17 is radially compressible, as would be expected, by virtue of its spring steel construction and the presence of the seam 18. When compressed, the pin 17 exerts considerable radial expansion force, and it is this force which is utilized to securely lock identical opposite ends 21 of the pin 17 in corresponding identical bores 22 machined in the piston head 11 and the ball joint 15.

In the present instance the normal uncompressed outside diameter of the roll pin 17 is 0.150 inch. However, the diameter of the pin 17 is obviously determined by the size of the piston 10 required and, accordingly, by the capacity of the fluid device (not shown).

Utilizing a roll pin 17 having a normal outside diameter of 0.15 inch along its entire length, each bore 22 in the piston head 11 and ball joint connector 15, respectively, is machined with a frusto-conical configuration wherein its side wall 30 preferably has a diameter of 0.143 inch adjacent its open end 31 and diverges into the bore to a diameter of 0.146 inch adjacent its closed end 32. To seat a corresponding end 21 of the roll pin 17 in a bore 22 of a piston head 11 or ball joint drive connector 15 with its annular end face 40 seated against the annular base 41 in the bottom of the bore 22, it will be seen that the end 21 of the roll pin 17 must be radially compressed.

Radially compressing each end 21 of the roll pin 17 slightly in excess of 0.007 inch (in the present instance) permits insertion of the corresponding end 21 in the bore 22 until it is bottomed. The end 21 of the roll pin 17 is then permitted to expand radially and grip the inner wall 30 of the bore 22 with the substantial force of the roll pin 17 attempting to radially expand to its normal outside diameter of 0.150 inch.

With an interference of 0.007 inch between the end 21 of the pin 17 and the outer open end 31 of the bore wall 30, a predetermined locking force of relatively high intensity is effected between the pin 17 and the piston head 11 or ball joint 15. In addition to this locking force, however, additional locking action is afforded by the frusto-conical configuration of the bore 22. This configuration permits the outermost end of the pin 17, adjacent its annular end face 40, to expand to a greater diameter of 0.146 inch.

The further expansion of the ends 21 of the roll pin adjacent their annular end faces 40 introduces a wedging effect between corresponding ends 21 of the roll pin 17 and frusto-conical shaped bores 22 if tension is applied to opposite ends of the piston 10 tending to draw the head 11 and ball joint connector 15 off the shank 16.

It should now be recognized that a simple and inexpensive piston 10 has been illustrated which is the structural equivalent in strength and durability of a one-piece machined piston or the like. In fact, the use of a separate roll pin 17 as the piston shank avoids machined part stresses normally found at the junctures of shank, piston head, and ball joint. Furthermore, if a piston head 11 or ball joint connector 15 becomes damaged or otherwise unserviceable during operation of a swash plate type fluid device, for example, the components can easily be replaced without discarding the entire piston 10. Correspondingly, the roll pin shank 16 can readily be replaced.

By making the shank 16 of a piston 10 in the form of a conventional roll pin 17, it will be seen that pistons of any desired length can be assembled by using a roll pin of a suitable length. Should an exceptionally long shank be required, a stiffening sleeve is preferably welded around the tube adjacent its mid-section, however, leaving the ends 21 radially compressible. At any rate, standard piston head 11 and ball joint connector 15 components can be utilized with varying length roll pins for adaption to one or another of a whole series of fluid devices. The savings in cost with such an arrangement are obvious.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A piston construction, comprising: a piston head adapted for sliding movement in a cylinder, said piston head having a generally cylindrical bore formed therein, a drive connection adapted to operatively connect the piston to receiving means, a shank connecting said piston head and said drive connection, said shank comprising a generally circular cylindrical hollow tube having one end seated in said bore, said tube having a longitudinally extending seam formed therein whereby it is radially resilient and compressible adjacent said one end, the normal transverse dimensions of said tube being larger than the greatest corresponding transverse dimensions of said bore so that radial compression of said tube when it is seated in said bore creates an interference fit between said tube and said piston head.

2. The piston construction of claim 1 further characterized in that the transverse dimensions of said bore increase slightly from the outermost end of said bore to the innermost end thereof, whereby a diverging side wall having a generally frusto-conical configuration is formed in said bore and said one end of said tube tends to resiliently expand to a greater extent toward said one end and wedge in said bore.

3. A piston construction, comprising: a piston head adapted for sliding movement in a cylinder, said piston head having a generally cylindrical bore formed therein, a drive connection adapted to operatively connect the piston to receiving means, said drive connection having a generally cylindrical bore formed therein, and a shank connecting said piston head and said drive connection, said shank comprising a roll pin formed of sheet metal and having a longitudinally extending seam along its entire length whereby said pin is radially resilient and compressible at least adjacent each of its opposite ends, one end of said roll pin seated in an interference fit in each of said generally cylindrical bores.

4. The piston construction of claim 3 further characterized in that said transverse dimensions of each of said bores increase slightly from the outermost end of a corresponding bore to the innermost end thereof, whereby a diverging side wall having a generally frusto-conical configuration is formed in each of said bores and a corresponding end of said pin tends to expand to a greater extent toward its end and wedge in a corresponding bore.

References Cited

UNITED STATES PATENTS

| 1,383,002 | 6/1921 | McIlvried | 92—109 |
| 2,080,698 | 5/1937 | Clark | 29—525 X |
| 2,210,158 | 8/1940 | Avakian | 29—525 X |
| 2,709,318 | 5/1955 | Benjamin | 287—20.3 X |
| 3,191,264 | 6/1965 | Undewood | 29—156.5 X |
| 3,199,872 | 8/1965 | Taylor | 287—20.3 X |
| 3,227,030 | 1/1966 | Preziozi | 85—8.3 X |

FOREIGN PATENTS 642,702  2/1937  Germany.

MARTIN P. SCHWADRON, *Primary Examiner.*

G. N. BAUM, *Assistant Examiner.*